United States Patent
He et al.

(10) Patent No.: US 8,169,939 B2
(45) Date of Patent: May 1, 2012

(54) MOBILE COMPUTATION DEVICE AND DATA PACKET RECEPTION METHOD THEREOF

(75) Inventors: Zhiqiang He, Beijing (CN); Zhongqing Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 624 days.

(21) Appl. No.: 12/158,624

(22) PCT Filed: Mar. 23, 2006

(86) PCT No.: PCT/CN2006/000475
§ 371 (c)(1),
(2), (4) Date: Sep. 8, 2008

(87) PCT Pub. No.: WO2007/076644
PCT Pub. Date: Jul. 12, 2007

(65) Prior Publication Data
US 2009/0238104 A1    Sep. 24, 2009

(30) Foreign Application Priority Data

Dec. 30, 2005    (CN) .......................... 2005 1 0097595

(51) Int. Cl.
*G08C 17/00*    (2006.01)
(52) U.S. Cl. .......................... 370/311; 455/574; 713/300
(58) Field of Classification Search .................... 370/311
See application file for complete search history.

(56) References Cited

U.S. PATENT DOCUMENTS

| | | | |
|---|---|---|---|
| 6,438,640 B1 | 8/2002 | Miyamoto et al. | |
| 6,526,507 B1 * | 2/2003 | Cromer et al. | ................ 370/311 |
| 6,718,465 B1 | 4/2004 | Lin | |
| 6,718,475 B2 | 4/2004 | Cai | |
| 6,799,279 B1 | 9/2004 | Okamoto et al. | |
| 2003/0117968 A1 * | 6/2003 | Motegi et al. | ................ 370/311 |
| 2005/0047356 A1 * | 3/2005 | Fujii et al. | ..................... 370/311 |
| 2005/0085245 A1 * | 4/2005 | Danneels | ...................... 455/466 |
| 2005/0160162 A1 * | 7/2005 | Cromer et al. | ................ 709/223 |
| 2005/0166077 A1 | 7/2005 | Reisacher | |
| 2005/0188232 A1 * | 8/2005 | Weng et al. | .................... 713/320 |
| 2005/0210299 A1 | 9/2005 | Mehta et al. | |
| 2009/0197652 A1 * | 8/2009 | Lundstrom et al. | ........... 455/574 |

FOREIGN PATENT DOCUMENTS

CN    1355474 A    6/2002

(Continued)

*Primary Examiner* — Chi Pham
*Assistant Examiner* — Farah Faroul
(74) *Attorney, Agent, or Firm* — Dickstein Shapiro LLP

(57) ABSTRACT

The present invention provides a mobile computation device and a data packet reception method thereof. The mobile computation device comprising a network communication module and a mobile computation unit, wherein the mobile computation device has a power supply for supplying power to the network communication module when the mobile computation device is in a power-off status, so that the network communication module receives a data packet from a network when the mobile computation device is in a power-off status. The method comprises sending an instruction of initiating downloading of communication content upon the reception of the data packet from the network, powering on relevant hardware necessary for the downloading of the communication content, initializing the relevant hardware and starting software corresponding to the downloading of the communication content, and downloading communication content needed to be downloaded from the network to a local harddisk. The present invention enables real time reception of communication service, fast power-on and automatic power-off of the device and reduction in power consumption.

6 Claims, 2 Drawing Sheets

FOREIGN PATENT DOCUMENTS

| | | |
|---|---|---|
| CN | 1516431 | 7/2004 |
| JP | 2003-323236 A | 11/2003 |
| JP | 2004-038295 A | 2/2004 |
| JP | 2004-334877 A | 11/2004 |
| JP | 2005-228327 A | 8/2005 |

* cited by examiner

MOBILE COMPUTATION DEVICE AND DATA PACKET RECEPTION METHOD THEREOF

BACKGROUND OF THE INVENTION

1. Field of Invention

The present invention relates to a mobile computation device and a data packet reception method thereof.

2. Description of Prior Art

Access to WAN wireless web has been making a rapid progress in recent years, and the bandwidth has also been expanded dramatically. This enables wireless communication based on the booming mobile computation industry while bringing exceptional application experience to users.

Currently, the mobile computation is still confronted with the trouble of limited battery capacity when it is in use. Thus, the mobile computation device requires the use of a large number of power-saving techniques to minimize its battery consumption in most cases. Under general situation, ways such as powering off the mobile computation device, weakening its communication performance or any other performance, etc., are often adopted in order to extend the use duration of the battery.

Generally, the mobile computation device is powered off when it is not in use, for the purpose of battery consumption reduction. But the mobile computation device cannot receive any data packet from a network when it is turned off. On the requirement for communication, the overall system of the device of the prior art must be started, including initiation of all hardware and manual startup of some operating system and application systems. Such manipulation will waste amounts of electric power and time, since manual operation on the mobile computation device is required to download all desired communication information to the local site. The same case also occurs in a computer system with wired network.

SUMMARY OF THE INVENTION

The first object of the present invention is to provide a mobile computation device.

Another object of the present invention is to provide a method for receiving a data packet by a mobile computation device.

The mobile computation device of the present invention comprises a network communication module and a mobile computation unit. The mobile computation device has a power supply for supplying power to the network communication module when the mobile computation device is in a power-off status, so that the network communication module receives a data packet from a network when the mobile computation device is in a power-off status.

The method for receiving a data packet by a mobile computation device of the present invention is adapted to receive a data packet from a network when the mobile computation device is in a power-off status. The method comprises Step 1, sending an instruction of initiating the downloading of communication content upon the reception of the data packet from the network, Step 2, powering on relevant hardware necessary for the downloading of the communication content, Step 3, initializing the relevant hardware and starting software corresponding to the downloading of the communication content, and Step 4, downloading the communication content needed to be downloaded from the network to a local harddisk.

Preferably, the method further comprises

Step 5, powering off the power supply for the relevant hardware after the download is completed.

The present invention can achieve beneficial effects. By supplying power to the network communication module by a self-standby power supply or a host power supply, the mobile computation device can be waken up and thus receive communication service in real time. By configuring the hardware startup for the mobile computation device with respect to different operations, it is possible to turn on the device quickly, reduce its power consumption and extend the use duration of the battery in the mobile computation device.

DETAILED DESCRIPTION OF PREFERRED EMBODIMENTS

Below, the mobile computation device of the present invention and the method for receiving a data packet from network in the power-off status of the mobile computation device will be described with reference to the figures, in which a wireless network is taken as example. Similarly, the present invention can also be applied to a wired network.

Figure 1:
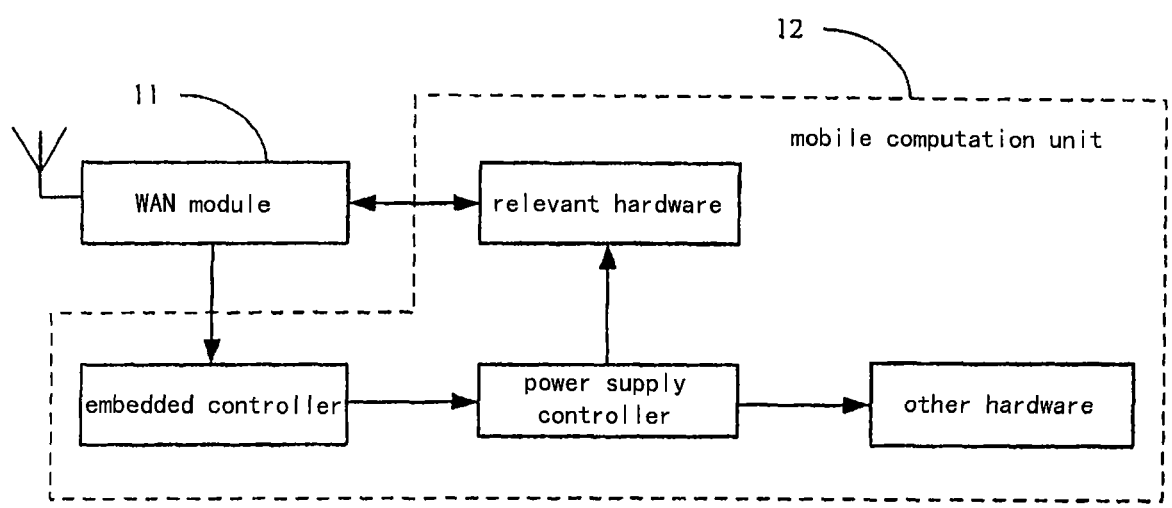
FIG. 1 is a schematic block diagram of a mobile computation device of the present invention.

As shown in FIG. 1, the mobile computation device of the present invention comprises a WAN module 11 and a mobile computation unit 12. The difference between the WAN module 11 and that in the prior art is that the former is provided with power even after the computation device is powered off and thus kept in a normal operation status, so as to continuously receive a data packet from a communication network after the device is powered off.

As one of the simplest approach to obtaining power supply, the WAN module 11 itself can have a standby power supply, such as a battery. When the mobile computation device is powered on, the mobile computation unit 12 supplies power to the WAN module 11 via an electrical interface between the two modules and thus charges the standby battery. When the mobile computation device is powered off, the WAN module 11 operates independently by using it's standby power supply. Obviously, the present invention is not limited to the approach of utilizing the above mentioned standby power supply. For those skilled in the art, there are many other approaches of supplying power to the WAN module 11 when the mobile computation device is powered off.

Further, the mobile computation unit 12 in FIG. 1 can be a general notebook computer or any other mobile terminal having similar functions. Having been started up, the unit 12 can exchange information with a communication network via the WAN module.

Hereafter, a description will be given to the method for receiving a data packet from network by the mobile computation device in its power-off status according to the present invention, taking a notebook computer as example.

The notebook computer corresponding to the mobile computation unit in the present invention has a standard configuration including an embedded controller (EC), CPU, HDD, a memory, a chipset, a power supply controller, etc. According to the present invention, these pieces of hardware can be classified in terms of different operations so that all of the hardware necessary for receiving a data packet from the network is divided into a class, while the other hardware belongs to another class. As shown in FIG. 1, the hardware required for receiving a data packet from the network includes CPU, chipset, memory, HDD, CD-ROM drive and the like. The other irrelevant hardware includes VGA, IO, VGA adaptor, OPD, display screen, etc.

By providing the standby power supply, the WAN module 11 is enabled to continuously operate in the power-off status of the computer. Having received a data packet from the network, the WAN module 11 sends an instruction of starting the downloading of communication content to the mobile computation unit 12. This instruction serves to wake up the embedded controller in the mobile computation unit 12 (Step 201). Here, this instruction is of the existing format and content executable by the mobile computation unit 12, such as an instruction of downloading a mail or an instruction of reading a CD file.

Specifically, the embedded controller can perform interruption detection by connecting a predefined GPIO port thereon with a corresponding output pin on the WAN module 11. Having been detected at the GPIO port, the instruction from the WAN module 11 is determined as a device power-on signal by the WAN module 11.

Next, after the embedded controller is woken up by the instruction, it controls the power-on sequence of the power supply controller to start up the mobile computation unit 12 (Step 202).

Here, the starting-up includes the start of the overall device, or only the relevant hardware configuration for the received instruction can be selectively started. The startup of the overall device is conducted in the same way as arbitrary one of the prior-art startup processes. The selective startup based on the received instruction, however, requires that correspondence configuration of various operations needed by the received network data packet and the hardware used in each of these operations is preset in the embedded controller (for example, setting a corresponding configuration table). In this way, when restarting from the power-off status, the mobile computation device can only start the relevant hardware according to the configuration table, instead of starting the overall device. In other words, any device unrelated to the current operation, such as USB, video card, display, keyboard controller and the like, may not be started. This will contribute to a fast startup of the mobile computation unit on one hand, and to the reduction in power consumption of the mobile computation device and the extension of battery operating duration on the other hand.

Table 1 shows a specific operation types and the corresponding hardware startup configuration (the mobile computation device is provided with appropriate software to enable these operations).

TABLE 1

| Operation type | Hardware | Software |
| --- | --- | --- |
| Receiving mail | CPU, MEM, HDD, chipset | e.g., Embedded LINUX, NOTES duplicator |
| Reading CD file | CPU, MEM, CD-ROM drive, chipset | e.g., File system, Copy program |
| ... | ... | ... |

As shown in Table 1, for the operation of receiving a mail, the configuration table specifies that the hardwares to be started for mail reception includes CPU, MEM, HDD and chipset. For the operation of reading a remote CD file, hardwares such as CPU, MEM, CD-ROM drive and chipset needs to be started. Upon reception of a read instruction, the hardware relevant to the reading operation is started, and then the read file is played.

During the process of startup, if BIOS detects that the current startup is the one required by the WAN module 11 to wake up the embedded controller, BIOS initializes the hardware configured for the operation depending on the operation type, and start the software corresponding to the operation after the initialization is finished (Step 203). The detection by BIOS in Step 203 can be conducted in such manner that, when the GPIO port mentioned above is connected to a south bridge register, the BIOS determines whether the current startup is the one required by the WAN module 11 to wake up the embedded controller by detecting the south bridge register.

Next, by using the software, the data to be downloaded are downloaded via the WAN module 11 from the wireless network to the local harddisk.

In an example of receiving a mail over the network, an embedded LINUX operating system (it can be a minimal LINUX operating system) is initiated at the end of BIOS startup to establish a network connection. Then, NOTES automatic duplicator is started to download the entire mail from a server to the local harddisk.

Further, the mobile computation device can be powered off after the data download is completed (Step 205).

Referring again to the above example, the NOTES automatic duplicator sends automatically a signal indicating duplication completion to the LINUX operating system at the end of the mail download operation. The LINUX operating system in turn executes an automatic power-off program according to the received signal.

From the above description, the present invention has the following advantages.

1. By supplying power to the WAN module by ways such as a self-standby power supply or a host power supply, the mobile computation device can be waken up and thus receive communication service in real time.
2. By configuring the hardware startup for the mobile computation device with respect to different operations, it is possible to turn on the device quickly, reduce its power consumption and extend the use duration of the battery in the mobile computation device.

Figure 2:
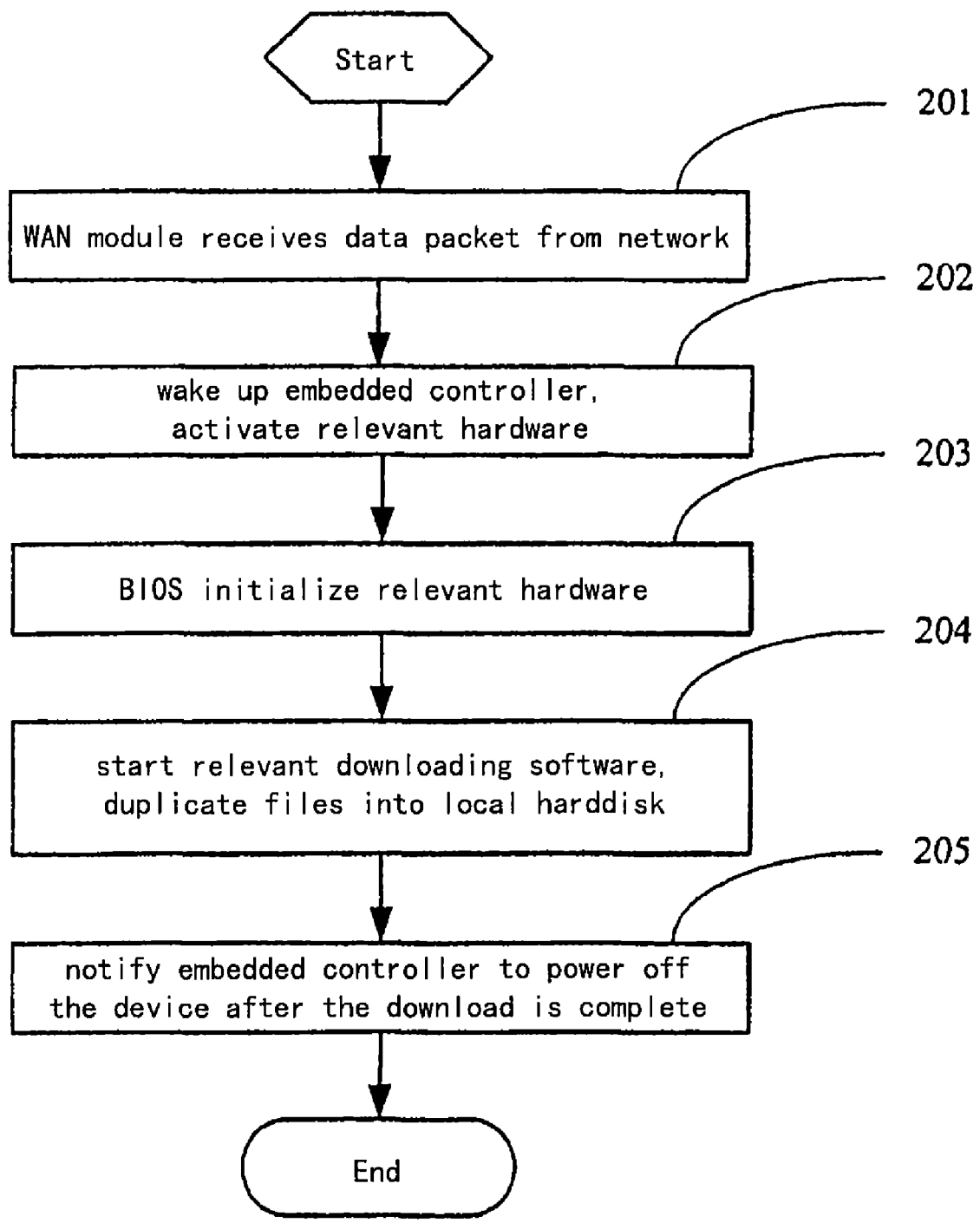
FIG. 2 is a flowchart of a method for receiving a data packet by the mobile computation device of the present invention.

The application of the present invention to a wireless network has been explained in the above description with reference to FIGS. 1 and 2. It can be appreciated that the present invention can also be applicable to a wired network. In this case, the only difference is to replace the WAN module with a wired network adapter, which is powered on in the same manner as that for the WAN module. The rest of the overall processing is identical, and description thereof is omitted.

The present invention is not limited to the above embodiments. Any modification, change or substitution readily made by those ordinarily skilled in the art after reading the application shall fall into the scope defined by the claims of the present invention.

What is claimed is:

1. A mobile computation device comprising a network communication module and a mobile computation unit, wherein
    the mobile computation device has a power supply for supplying power to the network communication module when the mobile computation device is in a power-off status, so that the network communication module receives a data packet from a network when the mobile computation device is in a power-off status, wherein the mobile computation device comprises an embedded controller, a power supply controller and hardware, and the network communication module is adapted to, having received a data packet from the network, send an instruction of starting downloading of communication content to the mobile computation device according to the data packet to wake up the embedded controller, the embedded controller is adapted to, having received the instruction, control, based on the received instruction, a power-on sequence of the power supply controller to selectively start hardware of the mobile computation device to be used in an operation corresponding to the receivec instruction, and BIOS initializes the hardware, wherein correspondence configuration information of various operations needed by the received network data packet and the hardware used in each of these operations is pre-set in the embedded controller.

2. The mobile computation device according to claim 1, wherein the network communication module comprises a WAN module or a wired network adapter.

3. The mobile computation device according to claim 2, wherein the power supply is a self-standby power supply or a host power supply.

4. The mobile computation device according to 1, wherein the hardware comprises CPU, a chipset, a memory, HDD and a CD-ROM drive.

5. A method for receiving a data packet by a mobile computation device, comprising a network communication module and a mobile computation unit, wherein the mobile computation device has a power supply for supplying power to the network communication module when the mobile computation device unit is in a power-off status, so that the network communication module can receive a data packet from a network when the mobile computation device unit is in a power-off status, the mobile computation unit comprises an embedded controller, a power supply controller and hardware;

the method being used to receive a data packet from a network when the mobile computation device is in a power-off status, wherein the method is characterized in comprising the steps of Step 1, sending to the mobile computation unit, by the network communication module according to the data packet, an instruction of initiating downloading of communication content upon the reception of the data packet from the network to wake up the embedded controller, Step 2, selectively powering on by the embedded controller and based on the received instruction, hardware of the mobile computation device to be used in an operation corresponding to the received instruction, Step 3, initializing, by the embedded controller, the hardware and starting software corresponding to the operation, and Step 4, downloading the communication content needed to be downloaded from the network to a local hard disk, wherein correspondence configuration information of various operations needed by the received data packet and the hardware used in each of these operations is pre-set in the embedded controller.

6. The method according to claim 5, further comprising

Step 5, powering off the mobile computation device after the data download is completed.

* * * * *